United States Patent [19]

Koning et al.

[11] Patent Number: 5,420,200

[45] Date of Patent: May 30, 1995

[54] THERMOPLASTIC POLYMER COMPOSITION

[76] Inventors: Cornelis E. Koning, Parkstraat 18, 6436 El Schinnen; Reinoldus J. M. Borggreve, Frank Smitsstraat 1, 6336 VG Hulsberg, both of Netherlands

[21] Appl. No.: 117,668

[22] Filed: Sep. 8, 1993

[30] Foreign Application Priority Data

Sep. 9, 1992 [NL] Netherlands .................... 9201564

[51] Int. Cl.$^6$ ................... C08F 265/02; C08F 279/04; C08L 71/12
[52] U.S. Cl. ........................................ 525/68; 525/71
[58] Field of Search ..................... 525/68, 71

[56] References Cited

U.S. PATENT DOCUMENTS

| | | | |
|---|---|---|---|
| 4,167,539 | 9/1979 | Heilman et al. | 525/285 |
| 4,234,701 | 11/1980 | Abolins et al. | 525/68 |
| 4,405,753 | 9/1983 | Deets et al. | 525/68 |
| 4,753,991 | 6/1988 | Bronstert | 525/98 |

FOREIGN PATENT DOCUMENTS 0071785  2/1983  European Pat. Off. .
0099062  1/1984  European Pat. Off. .

*Primary Examiner*—Thomas Hamilton, III
*Attorney, Agent, or Firm*—Cushman Darby & Cushman

[57] ABSTRACT

The invention relates to a thermoplastic polymer composition comprising a polyphenylene oxide; a graft copolymer (A), comprising a copolymer of a vinyl-aromatic compound, a vinyl cyanide and optionally a third monomer and a rubber, whereby the rubber is grafted on the backbone to the copolymer; and a graft copolymer (B) having polystyrene chains grafted on a copolymer backbone which contains units of a vinyl-aromatic compound and units of an $\alpha,\beta$-unsaturated dicarboxylic anhydride. The presence of graft copolymer (B) in the polymer composition causes a significant improvement of the notched impact resistance.

10 Claims, No Drawings

THERMOPLASTIC POLYMER COMPOSITION

FIELD OF THE INVENTION

The present invention relates to a thermoplastic polymer composition comprising a polyphenylene oxide; a graft copolymer (A), comprising (i) a copolymer backbone of a copolymer of a vinyl-aromatic compound, a vinyl cyanide and optionally a third monomer and (ii) a rubber grafted thereon; and a graft copolymer (B).

BACKGROUND OF THE INVENTION

According to U.S. Pat. No. 3,383,435 a polymer composition can contain a (2,6-dimethyl-1,4-phenylene oxide) polymer and an acrylonitrile-butadiene-styrene (ABS) graft copolymer. As described in U.S. Pat. No. 3,383,435, such a polymer composition is used for manufacturing various molded parts. However, the mechanical properties are not sufficient for use of this polymer composition in a number of applications. In particular, the notched impact resistance of that polymer composition is inadequate for a number of commercially important applications.

It would be a distinct advance in the art to provide a thermoplastic composition having significant improved notched impact strengths.

SUMMARY AND OBJECTS OF THE PRESENT INVENTION

The aim of the present invention is to prepare a thermoplastic polymer composition comprising a poly phenylene oxide and a graft copolymer (A) with greatly improved mechanical properties.

The polymer composition according to the invention is characterized in that the polymer composition contains a graft copolymer (B) of polystyrene chains grafted on a copolymer backbone, containing units of a vinyl-aromatic compound and units of an $\alpha,\beta$-unsaturated dicarboxylic anhydride.

Surprisingly, it has been found that the presence of graft copolymer (B) in the polymer composition causes a significant improvement of the notched impact resistance.

DETAILED DESCRIPTION OF THE INVENTION

The present invention relates to a thermoplastic polymer composition comprising a polyphenylene oxide; a graft copolymer (A), comprising (i) a copolymer (a) of a vinyl-aromatic compound, a vinyl cyanide and, optionally, a third monomer and (ii) a rubber backbone, wherein the copolymer (a) is grafted on the rubber; and a grafted copolymer (B) having a copolymer backbone (b), containing units of a vinyl-aromatic compound and units of an $\alpha,\beta$-unsaturated dicarboxylic anhydride, and polystyrene chains grafted thereon.

The polyphenylene oxide in the polymer composition according to the invention can be selected from among the commonly known polyphenylene oxides. Examples of polyphenylene oxides that are suitable for use in the polymer composition include, among others, poly-(2,6-dimethyl-1,4-phenylene oxide), poly-(2,6-dichloro-1,4-phenylene oxide), poly-(2,6-dimethoxy-1,4-phenylene oxide), poly-(2,6-diphenyl-1,4-phenylene oxide), poly-(2,6-dilauryl-1,4-phenylene oxide), poly-(2,6-diphenyl-1,4-phenylene oxide), poly-(2,6-dimethoxy-1,4-phenylene oxide), poly-(2,3,6-trimethyl-1,4-phenylene oxide), poly-(2,3,5,6-tetrapropyl-1,4-phenylene oxide), poly-(2,6-diethoxy-1,4-phenylene oxide), poly-(2-methoxy-6-ethoxy-1,4-phenylene oxide), poly-(2-ethyl-5-stearyloxy-1,4-phenylene oxide), poly-(2,6-dichloro-1,4-phenylene oxide), poly-(2,3-dimethyl-5-chloro-1,4 phenylene oxide), poly-(2-methyl-6-phenyl-1,4-phenylene oxide), poly-(2,6-dibenzyl-1,4-phenylene oxide), poly-(3-chloro-1,4-phenylene oxide), poly-(3,5-diethyl-1,4phenylene oxide), poly-(3-ethoxy-1,4-phenylene oxide), poly-(2-chloro-1,4-phenylene oxide), poly-(2,5-dibromo 1,4-phenylene oxide) and poly-(2,6-dibromo-1,4-phenylene oxide). A mixture of these compounds can also be used. Preferably poly-(2,6-dimethyl-1,4-phenylene oxide) is used. Polyphenylene oxides can be prepared according to well-known preparation methods such as described in, for instance, U.S. Pat. Nos. 3,306,874, 3,306,875 and 3,257,358.

The amount of polyphenylene oxide in the polymer composition can vary within relatively wide limits. In general about 1 to 99 wt. % polyphenylene oxide, relative to the overall weight of the polyphenylene oxide and graft copolymer (A), can be used in the polymer composition, although 25–75 wt. % is preferred.

The graft copolymer (A) comprises a copolymer of a vinyl-aromatic compound, a vinyl cyanide, and, optionally, a third monomer and a rubber, whereby the copolymer is grafted on the rubber. In practice about 1 wt. % to about 99 wt. % graft copolymer (A), relative to the overall weight of the polyphenylene oxide and graft copolymer (A), is usually used in the polymer composition. By preference, about 25 wt. % to about 75 wt. % of graft copolymer (A) is used present.

Vinyl-aromatic compounds suitable for use in the copolymer of graft copolymer (A) are selectable, for example, from among styrene, amethylstyrene, o-, m- or p-vinyltoluene, vinylnaphthalene, dimethylstyrene, t-butylstyrene and halogenated styrene derivatives, such as chlorostyrene or bromostyrene. Preferably the vinyl-aromatic compound used is styrene and/or a-methylstyrene. Graft copolymer (A) usually contains about 45 wt. % to about 90 wt. % vinyl-aromatic compound, preferably about 50 wt. % to about 75 wt. %

Suitable vinyl-cyanide compounds to be used in the copolymer of graft copolymer (A) are selectable, for example, from among acrylonitrile and cyanoalkylene compounds containing 4–7 carbon atoms, for example methacrylonitrile. Preferably the vinyl-cyanide compound used is acrylonitrile, methacrylonitrile or a mixture thereof. As a general matter, graft copolymer (A) contains about 5 wt. % to about 35 wt. % vinylcyanide compound, and preferably contains about 15 wt. % to about 30 wt. % vinyl cyanide compound.

The optional third monomer in the copolymer of graft copolymer (A) is selectable, for example, from among (meth)acrylates, for example methyl methacrylate and ethyl acrylate, $\alpha,\beta$-unsaturated dicarboxylic acids, $\alpha,\beta$-unsaturated dicarboxylic anhydrides, such as maleic anhydride, and imide derivatives thereof, whether or not substituted, such as maleimide and N-phenylmaleimide.

The rubber used in graft copolymer (A) can be selected from the known rubbers. In general, these rubbers have glass transition temperatures below about $-10°$ C. Suitable rubbers are selectable, for example, from among butadiene rubbers and ethylene-propylene copolymers, which optionally contain a third copolymerisable diene monomer, such as 1,4-hexadiene, dicyclopentadiene, dicylooctadiene, methylene norbornene, ethylidene norbornene and tetrahydroindene.

Optionally, if desired, graft copolymer (A) also contains a minor amount of natural rubber and/or an elastomer that is substantially composed of 1,3-diene compounds, for example butadiene-1,3, isoprene and 2,3-dimethylbutadiene-1,3. By preference, polybutadiene homopolymers or of butadiene copolymers having butadiene contents of about 60 wt. % to about 90 wt. % are used. If other dienes, such as isoprene or the lower alkyl esters of alkylic acid, are used as a comonomer, the butadiene content of the rubber can be reduced to about 30 wt. % without adversely affecting the mechanical properties of graft copolymer (A). More preferred is a butadiene-1,4 rubber. Graft copolymer (A) usually contains about 5 wt. % to about 25 wt. %, preferably about 10 wt. % to about 20 wt. %, of rubber.

Particularly suitable graft copolymers (A) for the polymer composition according to the invention are acrylonitrile-styrene-butadiene (ABS), acrylonitrile styrene-acrylate (ASA) and ethylene-propylene-diene rubber, graft polymerized with styrene and acrylonitrile (AES). A particularly suitable graft copolymer is acrylonitrile-styrenebutadiene (ABS).

In addition to graft copolymer (A) the polymer composition can, if desired, contain a copolymer that contains the aforementioned vinyl-aromatic compounds, vinylcyanide compounds and/or third monomers. An example of such a copolymer is a styrene-acrylonitrile copolymer, which is often used in combination with the acrylonitrile butadiene-styrene graft copolymer. The styrene acrylonitrile copolymer usually contains about 60 wt. % to about 95 wt. % or preferably about 65 wt. % to about 80 wt. % of vinyl-aromatic compound. The amount of vinyl-cyanide compound in the copolymer is usually about 5 wt. % to about 40 wt. %, preferably about 20 wt. % to about 35 wt. %.

Graft copolymer (A) can be synthesized according to methods known to those skilled in the art. Examples of such methods are processes for mass polymerization, emulsion polymerization, suspension polymerization and mass-suspension polymerization. The usual auxiliaries can be used in the polymerization. Examples of such substances are chain-length regulators, emulsifiers and compounds supplying free radicals. The acrylonitrile-butadienestyrene graft copolymers that are extremely suitable for the polymer composition according to the invention are commonly known freely-obtainable products, just like the aforementioned styrene-acrylonitrile copolymers. The mechanical properties of the polymer composition according to the invention can optionally be improved by adding a rubber that is entirely or partly compatible with the polyphenylene oxide and/or graft copolymer (A). In general the rubber can be selected, for instance, from among butadiene rubbers, ethylene-propylene rubbers (EPR), ethylene-propylene-diene rubbers (EPDM), styrene-butadiene rubbers (SBR), isobutylene rubbers, nitrile-butadiene rubbers (NBR) and acrylate rubbers. A requirement is that the rubber used must be modified with either functional groups that are reactive with the polyphenylene oxide and/or graft copolymer (A) or polymer chains that are entirely or partly compatible with at least one of these components of the polymer composition.

Preferably the rubber is selected from among statistical, block and graft copolymers based on vinyl-aromatic monomeric units and conjugated diene monomers. Examples of such block copolymers are block copolymers of type A-B-A and type A-B, in which A is polystyrene and B an elastomeric diene, for example butadiene. The butadiene parts in the rubber are optionally entirely or partly hydrogenized.

The vinyl-aromatic monomeric units in the abovementioned rubber can be selected from the group comprising styrene, methylstyrene, dimethylstyrene, isopropylstyrene, α-methylstyrene, ethylvinyltoluene and the like. Optionally small amounts of a different monomer, for example (meth)acrylate, (meth)acrylonitrile and (meth)acrylic acid can be copolymerized.

The aforementioned rubbery graft copolymers can be obtained for example through graft copolymerization of vinyl-aromatic monomeric units on a rubber. This rubber can be chosen from the group comprising polybutadiene, styrene-butadiene copolymer, acrylonitrile-butadiene copolymer, ethylene-propylene copolymer, ethylene-propylene-diene rubber, polyacrylate and the like.

A person skilled in the art will be able to select the most suitable rubber for further improving the mechanical properties of the polymer composition according to the invention.

The polymer composition can contain 0.1–20 wt. % graft copolymer (B), relative to the total weight of the polyphenylene oxide, graft polymer (A) and graft copolymer (B).

Suitable vinyl-aromatic compounds, which the backbone of graft copolymer (B) can contain, include, among others, styrene, α-methylstyrene and styrene derivatives that are substituted at the aromatic ring. Suitable substituents include, for example, halogens such as, for instance, fluorine, chlorine, bromine, iodine, and alkyl groups having 1–8 carbon atoms. Exemplary of such $C_1$ to $C_8$ alkyl groups are for instance methylene, ethylene, propylene and N-butyl. A mixture of different vinyl-aromatic compounds can, if desired, be used. The graft copolymer (B) can contain 55–95 wt. % vinyl-aromatic compound. By preference, the vinyl-aromatic compound is styrene, α-methylstyrene or a mixture thereof.

The $α,β$-unsaturated dicarboxylic anhydride, which the backbone of graft copolymer (B) can contain, can, for example, be selected from among maleic anhydride, itaconic anhydride, citraconic anhydride, methylmaleic anhydride and chloromaleic anhydride. The copolymer can contain 5–45 wt. $α,β$-unsaturated dicarboxylic anhydride. Preferably maleic anhydride is used. Optionally, if desired, the $α,β$-unsaturated dicarboxylic anhydride can be entirely or partially imidated. Imitation can be effected by various means such as, for instance, by causing the $α,β$-unsaturated dicarboxylic anhydride to react with for example $NH_3$ or aniline. A suitable process is described in for example DE-C-3,430,802.

Copolymers of a vinyl-aromatic compound and an $α,β$-unsaturated dicarboxylic anhydride, used as the copolymer backbone in graft copolymer (B), are known to those skilled in the art and are commercially available.

The polystyrene chains in graft copolymer (B) are chemically connected with the aforementioned copolymer backbone. This is usually effected by providing the polystyrene with one or more reactive groups which can react with the copolymer backbone. Such a polystyrene is called a functionalized polystyrene. The functionalized polystyrene contains one or more compounds, containing one or more groups selected from the group comprising NH$_2$, isocyanate, hydroxyl, epoxy and oxazoline groups.

In the context of the present invention, the functionalised polystyrene is a polymer that is substantially composed of monomeric styrene units—the monomeric styrene units may optionally be entirely or partly replaced by monomeric αmethylstyrene units—and that contains one or more compounds containing one or more functional groups such as NH$_2$, isocyanate, hydroxyl, epoxy or oxazoline. The functionalised polystyrene generally has a weight average molecular weight, M$_w$, of between 1000 and 300,000; preferably between 15,000 and 150,000. A method for preparation of polystyrene is known to those skilled in the art and is described in, for example, EP-A-0,071,785.

A terminally amine-functionalised polystyrene can for example be prepared according to the method described in DE-A-3,527,909 and in its counterparts such as U.S. Pat. No. 4,753,991. A styrene polymer containing amine, isocyanate and/or oxazoline groups can for example be obtained by copolymerizing styrene and/or a-methyl styrene with for example vinyl-oxazoline, m-aminostyrene, p-aminostyrene, m-isopropenyl-α,α-dimethylbenzylisocyanate, m-aminomethylstyrene or p-amino methylstyrene.

The functionalized polystyrene generally contains 1-300 functional compounds per 3,000 monomeric units, each functional compound containing at least one of these functional groups: NH$_2$, hydroxyl, epoxy and oxazoline. Preferably the polystyrene is terminally functionalised with such a compound. More preferably the polystyrene is terminally functionalised with an N$_2$ group.

Graft copolymer (B) can, for example, be obtained by causing the functionalised polystyrene to react with the backbone copolymer (B) contains the backbone units of a vinyl-aromatic compound and units of an α,β-unsaturated dicarboxylic anhydride. This reaction can be concluded in solution such as in a solvent such as methyl ethyl ketone, or in the melt.

The polymer composition according to the invention can be obtained by mixing the individual components in a suitable, commonly known, mixing device. A batch kneader, a single- or twin-screw extruder or a static mixer could be used as a mixing device.

Additives may optionally be added to the polymer composition according to the invention. Examples are impact modifiers, stabilizers, antioxidants, lubricants, fillers, colorants, pigments, flame retardants, reinforcing fibers and conductive fibers.

The invention is further described with reference to the following non-limiting examples and comparative experiments.

EXAMPLES

Examples I and II and Comparative Experiments A and B

Example I

A terminally amine-functionalised polystyrene (PS-NH$_2$) was prepared according to the method described in DE-A-3,527,909. The number average molecular weight, M$_n$ was 16500. 32.5 parts by weight PS-NH$_2$ were then dissolved in methyl ethyl ketone and were caused to react with 67.5 parts by weight styrene-maleic anhydride copolymer (SMA, 28 wt. % maleic anhydride, M$_2$=110,000), which resulted in the formation of an SMA-g-PS graft copolymer.

The SMA-g-PS graft copolymer was then precipitated in methanol, filtered off and dried at reduced pressure and a temperature of 80° C.

Five parts by weight of the graft copolymer obtained above were mixed with 60 parts by weight acrylonitrile-butadiene-styrene copolymer (ABS, Ronfalin$^R$ TZ220, DSM), 16.6 parts by weight styrene-acrylonitrile copolymer (SAN, 27 wt. % acrylonitrile, [$\eta$]$^{20°~C.}$=67.5 ml/g, from DSM) and 18.4 parts by weight poly(2,6-dimethyl-1,4 phenylene oxide) (PPO, [$\eta$]$^{int}$(CHCl$_3$, 25° C.)=0.45 dl/g, dissolved in chloroform (CHCl$_3$)). The polymer composition was mixed in a Haake kneader for 5 minutes at a temperature of 280° C.

The polymer composition obtained was compressed using a Fontaine press at a temperature of 230° C. under the following conditions:

| | |
|---|---|
| 7 min. | 0 Kn |
| 3 min. | 100 Kn |
| 2 min. | 200 Kn |
| 5 min. | 500 Kn |
| cooling | 500 Kn. |

Test specimens were sawn from the plates thus compressed; the notched impact resistance (Izod, notched according to ISO-180) of these specimens was determined: 5.9 Kj/m$^2$.

Comparative Experiment A

A polymer composition containing 20.0 parts by weight poly(2,6-dimethyl-1,4-phenylene oxide) (PPO, [$\eta$]$^{int}$(CHCl$_3$, 25° C.)=0.45 dl/g), 60.0 parts by weight acrylonitrile-butadiene-styrene copolymer (ABS. Ronfalin ® TZ220, DSM) and 20.0 parts by weight styrene-acrylonitrile copolymer (SAN, from DSM) was prepared by mixing the components for 5 minutes in a Haake kneader at a temperature of 280° C.

The polymer composition obtained was compressed in the same manner as described for Example I, using a Fontaine press at a temperature of 230° C. The notched impact resistance (Izod, notched according to ISO-180) was determined of test specimens sawn from the plates thus compressed. It was found to be 3.3 Kj/m$^2$.

Example II

Five parts by weight of the SMA-g-PS graft copolymer prepared in Example I were mixed with 51.3 parts by weight acrylonitrile-butadiene-styrene copolymer (ABS, Ronfalin ® TZ220, DSM), 25.2 parts by weight styrene-acrylonitrile copolymer (SAN, from DSM), 13.4 parts by weight poly(2,6-dimethyl-1,4-phenylene oxide) (PPO, [$\eta$]$^{int}$(CHCl$_3$, 25° C.)=0.45 dl/g) and 5.0 parts by weight styrene-ethylene-butylene-styrene block copolymer (Kraton G1650, Shell). The polymer composition was mixed for 5 minutes in a Haake kneader at a temperature of 280° C.

The polymer composition obtained was compressed in the manner described in Example I using a Fontaine press at a temperature of 230° C. The notched impact resistance (Izod, notched according to ISO-180) of test specimens sawn from the plates thus compressed was determined. It was found to be 10.6 Kj/m$^2$.

Comparative Experiment B 51.3 parts by weight of ABS (acrylonitrile-butadiene-styrene copolymer, Ronfalin ® TZ220, from DSM), 28.7 parts by weight styrene-acrylonitrile copolymer (SAN, from DSM), 15.0 parts by weight poly(2,6-dimethyl-1,4-phenylene oxide) (PPO, $[\eta]^{int}$(CHCl$_3$, 25° C.)=0.45 dl/g) and 5.0 parts by weight styrene-ethylene-butylene-styrene block copolymer (Kraton G1650, Shell) were mixed and compressed under the same conditions as in Example II. The notched impact resistance (Izod, notched according to ISO-180) of test specimens sawn from the plates was found to be 2.2 Kj/m$^2$. The examples show that the addition of a graft copolymer (B) of polystyrene chains on a copolymer, which contains units of a vinyl-aromatic compound and units of an α,β-unsaturated dicarboxylic anhydride, to the polymer composition causes a significant improvement of the mechanical properties. The notched impact resistance of the polymer composition according to the invention is greatly improved.

What is claimed is:

1. A thermoplastic polymer composition comprising a polyphenylene oxide; a graft copolymer (A) comprising (i) a copolymer (a) of a vinyl-aromatic compound, a vinyl cyanide, and, optionally, a third monomer, and (ii) a rubber backbone, whereby the copolymer (a) is grafted on the rubber; and a grafted copolymer (B) having a copolymer backbone (b), containing units of a vinyl-aromatic compound and units of an α,β-unsaturated dicarboxylic anhydride, and polystyrene chains grafted thereon.

2. A thermoplastic polymer composition according to claim 1, wherein the polymer composition contains 0.1–20 wt. % of graft copolymer (B), relative to the total weight of the polyphenylene oxide, graft copolymer (A) and graft copolymer (B).

3. A thermoplastic polymer composition according to claim 1, wherein the polystyrene chains of graft copolymer (B) have a weight average molecular weight of between 15,000 and 150,000.

4. A thermoplastic polymer composition according to claim 1, wherein graft copolymer (B) the polystyrene chains have from 1 to 300 functional compounds per 3,000 monomeric units and are bound to the backbone copolymer, which contains units of a vinyl-aromatic compound and units of an α,β-unsaturated dicarboxylic anhydride.

5. A thermoplastic polymer composition according to claim 1, wherein polystyrene chains in graft copolymer (B) are terminally bound to the backbone copolymer, which contains units of a vinyl-aromatic compound and units of an α,β-unsaturated dicarboxylic anhydride.

6. A thermoplastic polymer composition according to claim 1, wherein the polyphenylene oxide is poly-(2,6-dimethyl-1,4-phenylene oxide).

7. A thermoplastic polymer composition according to claim 1, wherein the graft copolymer (A) is an acrylonitrile-butadiene-styrene copolymer.

8. A thermoplastic polymer composition according to claim 1, wherein the polymer composition contains 25–75 wt% graft copolymer (A), relative to the total weight of the polyphenylene oxide and graft copolymer (A).

9. A thermoplastic polymer composition according to claim 1, wherein the polymer composition contains a rubber that is at least partly compatible with the polyphenylene oxide and/or graft copolymer (A).

10. A thermoplastic polymer composition according to claim 9, wherein the rubber is selected from the group consisting of statistical, block and graft copolymers based on vinyl-aromatic monomeric units and conjugated diene monomers.

* * * * *